United States Patent

Nitta et al.

Patent Number: 6,039,904
Date of Patent: Mar. 21, 2000

[54] METHOD OF ADJUSTING A HEAT-DISPLACING T-DIE

[75] Inventors: Satoru Nitta; Koji Mizunuma, both of Shizuoka, Japan

[73] Assignee: Toshiba Machine Co., Ltd., Tokyo, Japan

[21] Appl. No.: 09/025,444

[22] Filed: Feb. 17, 1998

[30] Foreign Application Priority Data

Feb. 14, 1997 [JP] Japan .................................. 9-030911

[51] Int. Cl.⁷ ................................................. B29C 47/00
[52] U.S. Cl. .......................................... 264/40.5; 425/141
[58] Field of Search ................................ 264/40.5, 40.1, 264/177.16; 425/141, 466; 364/475.01

[56] References Cited

U.S. PATENT DOCUMENTS

| | | | |
|---|---|---|---|
| 3,940,221 | 2/1976 | Nissel ........................................ | 425/141 |
| 4,454,084 | 6/1984 | Smith et al. ............................... | 264/40.1 |
| 4,592,710 | 6/1986 | Reifenhauser et al. ................... | 425/141 |
| 4,594,063 | 6/1986 | Reifenhauser et al. ................... | 425/141 |
| 4,931,982 | 6/1990 | Hayashida et al. ....................... | 364/473 |
| 4,978,289 | 12/1990 | Maejima .................................. | 425/141 |
| 4,994,976 | 2/1991 | Akasaka .................................. | 364/473 |
| 5,622,730 | 4/1997 | Nitta et al. ............................... | 425/141 |

*Primary Examiner*—Jan H. Silbaugh
*Assistant Examiner*—Mark Eashoo
*Attorney, Agent, or Firm*—Whitham, Curtis & Whitham

[57] ABSTRACT

A novel method of adjusting a heat-displacing T-die is provided wherein a T-die slit gap is adjusted by thermal expansion and contraction of die bolts individually provided with heaters so that a sheet or film material has a target profile in thickness, characterized in that a thickness feed back control loop and a virtual temperature control loop are provided, and in the thickness feed back control loop, data of thickness of products are subjected to a profile treatment to correct a target profile for temperature setting and changing of die bolts so as to define an appropriate slit gap, and in the virtual temperature control loop, an appropriate die bolt temperature is predicted from a control output value of the heater and a radiation temperature to the circumference so as to calculate a corresponding power to be supplied to the heater.

6 Claims, 9 Drawing Sheets

METHOD OF ADJUSTING A HEAT-DISPLACING T-DIE

BACKGROUND OF THE INVENTION

The present invention relates to a method of adjusting a heat-displacing T-die for sheet formation and film formation, and more particularly to a method of adjusting a heat-displacing T-die to permit convenient and proper profile control of sheets and films by cascade control to a lip adjusting amount of the T-die in a virtual temperature adjusting loop for estimation and operation on the basis of control output data of a heat-displacing actuator and a thickness feed back control loop calculated from data of thickness of formed products.

In general, a heat-displacing T-die having a structure as shown in FIG. 1 is used for sheet formation and film formation. The heat-displacing T-die has a body 10. A T-die lip 14 is formed as a part of the body 10 of the heat-displacing T-die. The T-die lip 14 has a slit gap 12 for extrusion molding of a molten resin into the shape of a sheet. A large number of die bolts 16 are further provided which extend in a direction along which the slit gap 12 is formed, so that the die bolts 16 are made into contact with the T-die lip 14. Each of the die bolts 16 is provided with a temperature-adjustable heater 18 which is electrically connected to a cable 20 for supplying a controlled current to the heater 18. Another heater 22 is provided on a top surface of the body 10 of the heat-displacing T-die for temperature control of the body 10. Inside of the T-die lip 14, a flexible necked down portion 14a is formed in the body 10.

The slit gap 12 of the T-die lip 14 is adjusted by thermal expansion of the die bolts 16 having received a heat from the heater 18.

There are known in the art a heat direct-acting type and a heat reverse-acting type.

As illustrated in FIG. 2, the heat-displacing T-die of the heat direct-acting type has the following structure. A heater holder 18 is provided for holding the die bolt 16. The heater holder 18 holes a first end portion 16a of the die bolt 16 near the T-die lip 14, so that a temperature rising of the heater 18 causes an expansion of the die bolt 16 toward the T-die lip 14 whereby the first end portion 16a of the die bolt 16 presses down the T-die lip 14. As a result, the slit gap 12 of the T-die lip 14 is narrowed.

As illustrated in FIG. 3, the heat-displacing T-die of the heat reverse-acting type has the following structure. A heater holder 18 is provided for holding the die bolt 16. The heater holder 18 holds a second end portion 16b of the die bolt 16 opposite to the first end portion 16a near the T-die lip 14, so that a temperature rising of the heater 18 causes an expansion of the die bolt 16 in a direction opposite to the direction toward the T-die lip 14 whereby the second end portion 16b of the die bolt 16 is withdrawn from the T-die lip 14. As a result, the slit gap 12 of the T-die lip 14 is widened.

In the prior art, as the method of adjusting the heat-displacing T-die, a feed back system of FIG. 4 and a cascade system of FIG. 5 have been known.

In accordance with the feed back system of FIG. 4, a target profile is transmitted through a profile control unit 30, a die bolt heater control unit 32, and a die bolt-lip system 34 to a forming processor 36 for profile control of a sheet. The result of the profile control is then processed in a profile processor 38 so as to be fed-back to the profile control unit 30. Those feed back control and operations are carried out at a constant period. A power to be supplied to the heater of the die bolt is renewed step-like. As a result, a thickness of the sheet at a correspondence position is exponentially increased and then reaches an equilibrium state, during which it takes a time of a few times as long as a time constant of the heater. The above variation can be detected after an unnecessary time L has been passed. For this reason, a vibration in the shape of a saw-tooth is likely to appear in the profile due to overshoot. Since the influence by external disturbance can be detected only by a thickness gauge, a correct operation to the externally disturbed D1 to D4 is late thereby making it difficult to improve the accuracy of the adjustment.

FIG. 5 is illustrative of the cascade system wherein the target profile is transmitted through a profile control section 40, a temperature control section 41, a die bolt heater control unit 42 and a die bolt-lip system 44 to a forming processor 46 for profile control of the sheet. In this case, the temperature of the heater is detected, so that the detected temperature value is then fed back to the temperature control unit 41. The result of the profile control made by the forming process is then processed by a profile processing unit 48 for feeding the same back to the profile control unit 40 for performing a cascade control so that the temperature to be set for each die bolt is renewed by step like and a power to be supplied to the heater is adjusted.

It is, for example, disclosed in the Japanese Patent Publication No. 1-22140 that processing is made for the mutual thermal interference between adjacent die bolts to calculate the temperature having been newly set for each die bolt so that an initial die bolt temperature having previously been set, which provides no temperature influence to the material, is compared to an average of all of the newly set die bolt temperature calculated so that the average is adjusted to correspond to the initial die bolt temperature whereby a heat-displacing T-die slit gap is adjusted in the vicinity of an optimum temperature for forming the material.

In the cascade control system, a slave loop for the die bolt temperature is provided in a master loop for the profile as illustrated in FIG. 5, for which reason the die bolt temperature having been set is renewed step like by an instruction of the master loop whereby PID operation is effected for quick correction. D1 and D2 in the external disturbances are almost completely processed in the slave loop, resulting in remarkable improvements in responsibility and stability.

In the above conventional feed back system, the temperature of the heater of the heat-displacing T-die is not detected and a control to the heater is decided directly from the thickness deviation, for which reason the following advantages and disadvantages are caused.

It is advantageous that since no temperature sensor is provided, the heater has a simple structure and the control unit with one loop is also simple.

It is, however, disadvantageous that it takes a long time for movement to the thickness gauge of the sheet extruded from the heat-displacing T-die. The displacement of the T-die lip is caused by thermal expansion of contraction of the die bolt due to a temperature variation of the heater. Even if the power to be supplied to the heater is kept constant, then the temperature is varied.

In the above cascade system, in order to improve the disadvantages of the feed back system, a temperature sensor is provided for the die bolt provided with the heater for temperature control of individual die bolt. This cascade system has the following advantages and disadvantages.

It is advantageous that since in order to detect and manage the temperature of the heater, variation of the heat-displacing T-die slit is predictable directly from the detected value of the die bolt temperature, a temperature control loop can be set in a constant time regardless of an unnecessary time from the heat-displacing T-die from the thickness gauge.

It is, however, disadvantageous that a temperature sensor is provided for each die bolt whereby the structure is complicated and the wiring of leads between to the heater and the sensor is also complicated. As a result, the manufacturing cost thereof is increased.

In the above circumstances, it had been required to develop a novel method of adjusting a heat-displacing T-die in a cascade system of a temperature control loop and a thickness feed back control loop free from the above disadvantages.

SUMMARY OF THE INVENTION

Accordingly, it is an object of the present invention to provide a novel method of adjusting a heat-displacing T-die in a cascade system of a temperature control loop and a thickness feed back control loop, free from the above disadvantages.

It is a further object of the present invention to provide a novel method of adjusting a heat-displacing T-die in a cascade system of a temperature control loop and a thickness feed back control loop, wherein a temperature of the die bolt is predicted from the past heater control output value and a radiation temperature to the circumferences of the heater is provided so that a corresponding heater control output value is calculated in a virtual temperature control loop whereby a profile control of the sheet is simply and properly carried out without use of a temperature sensor.

The above and other objects, features and advantages of the present invention will be apparent from the following descriptions.

In accordance with the present invention, a novel method of adjusting a heat-displacing T-die wherein a T-die slit gap is adjusted by thermal expansion and contraction of die bolts individually provided with heaters so that a sheet or film material has a target profile in thickness, characterized in that a thickness feed back control loop and a virtual temperature control loop are provided, and in the thickness feed back control loop, data of thickness of products are subjected to a profile treatment to correct a target profile for temperature setting and changing of die bolts so as to define an appropriate slit gap, and in the virtual temperature control loop, an appropriate die bolt temperature is predicted from a control output value of the heater and a radiation temperature to the circumference so as to calculate a corresponding power to be supplied to the heater.

BRIEF DESCRIPTION OF THE DRAWINGS

Preferred embodiments according to the present invention will be described in detail with reference to the accompanying drawings.

PREFERRED EMBODIMENTS
FIRST EMBODIMENT

Figure 6:
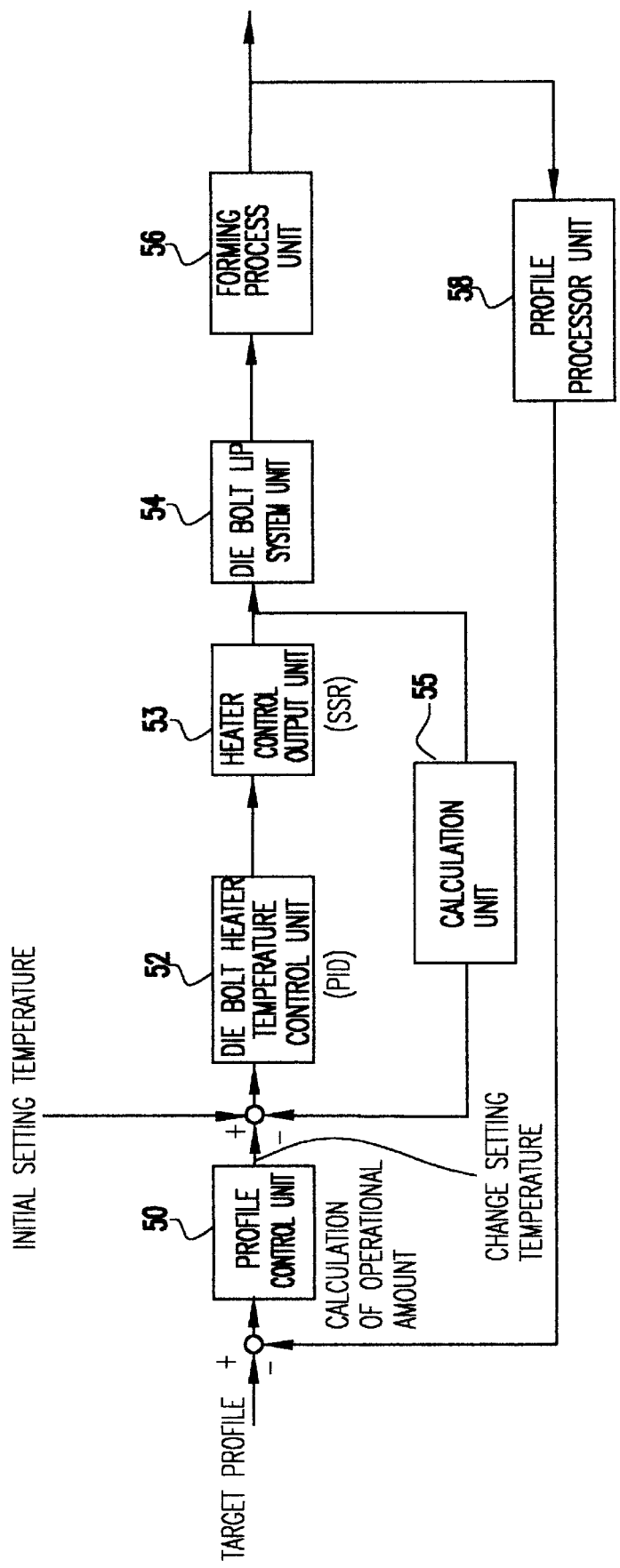
FIG. 6 is a block diagram illustrative of a system for adjusting a heat-displacing T-die.

A first embodiment according to the present invention will be described in detail with reference to the drawings. A method of adjusting a heat-displacing T-die is provided. FIG. 6 is a block diagram illustrative of a system for adjusting a heat-displacing T-die.

Figure 1:
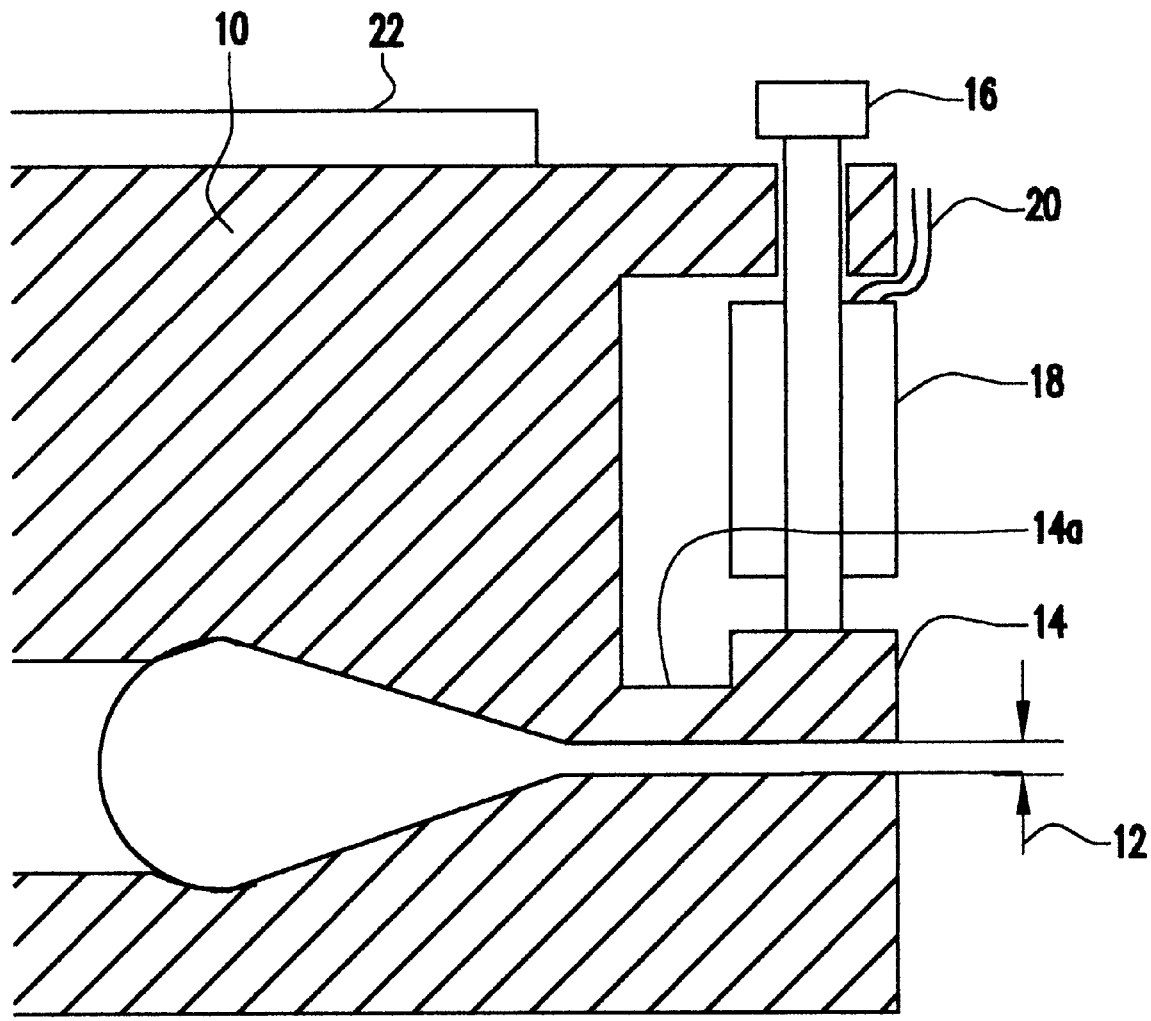
FIG. 1 is fragmentary cross sectional elevation view illustrative of the heat-displacing T-die to be used for sheet formation and film formation.
Figure 2:
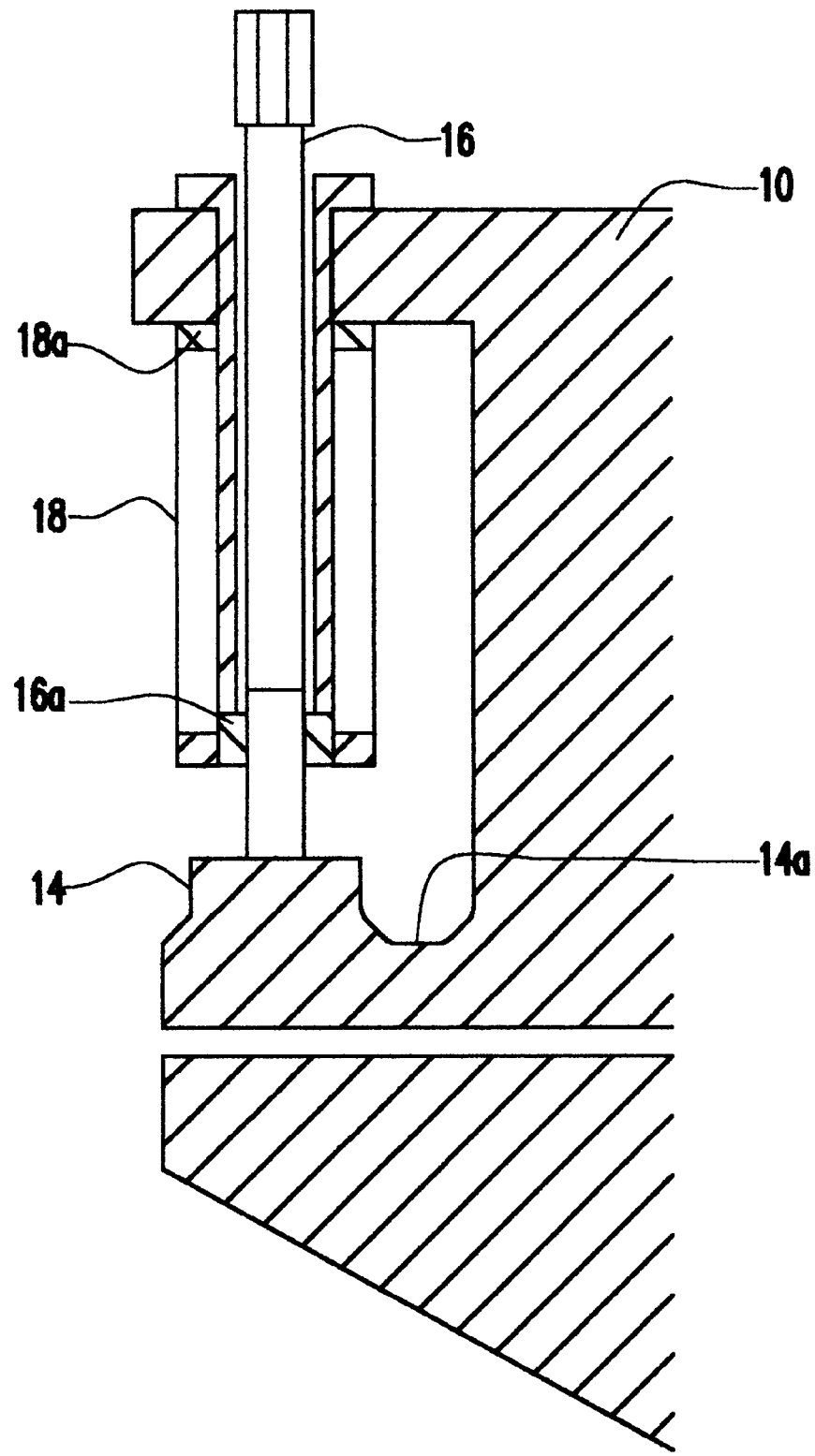
FIG. 2 is fragmentary cross sectional elevation view illustrative of the heat-displacing T-die of the heat direct-acting type.
Figure 3:
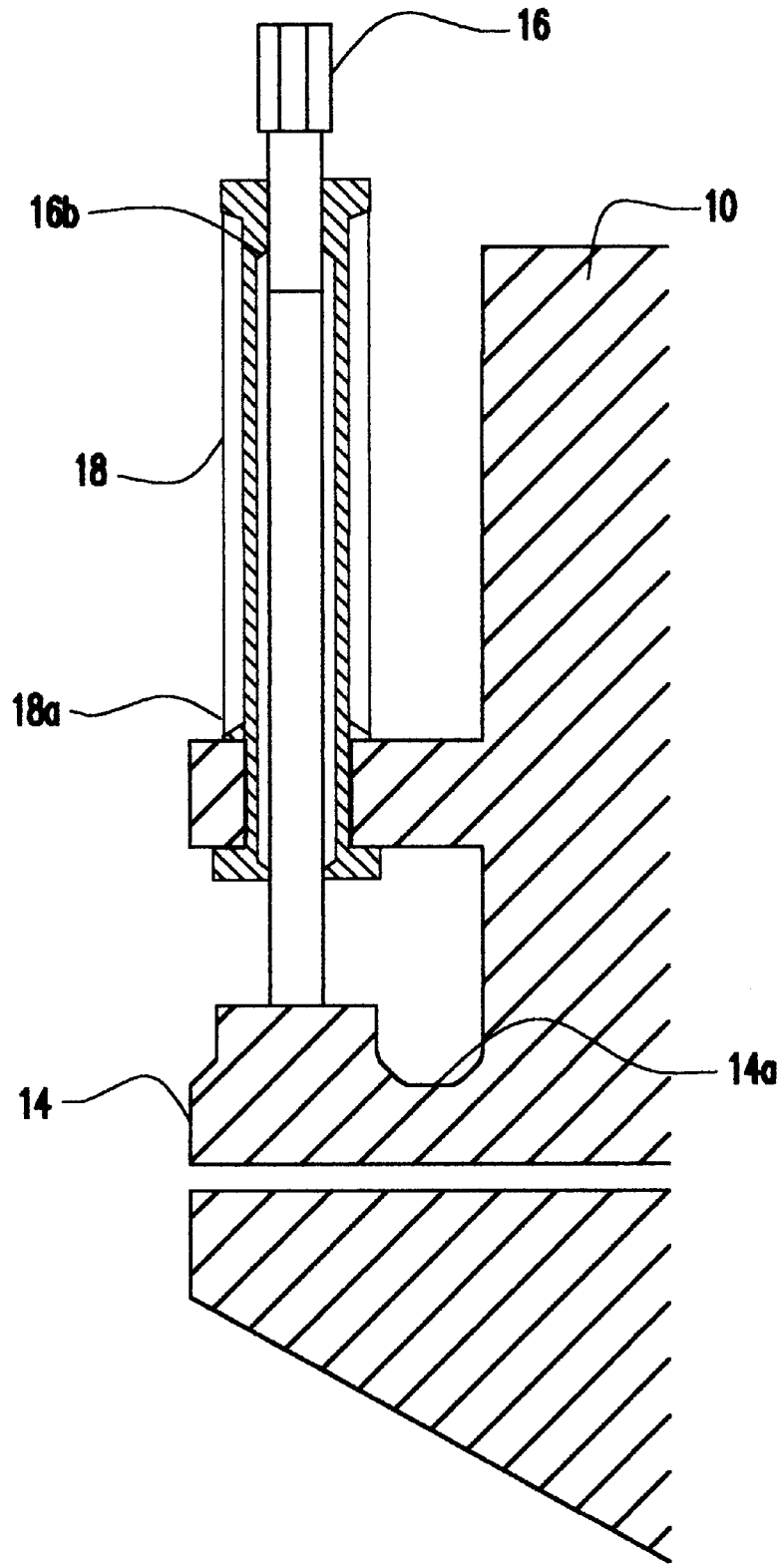
FIG. 3 is fragmentary cross sectional elevation view illustrative of the heat-displacing T-die of the heat reverse-acting type.
Figure 4:
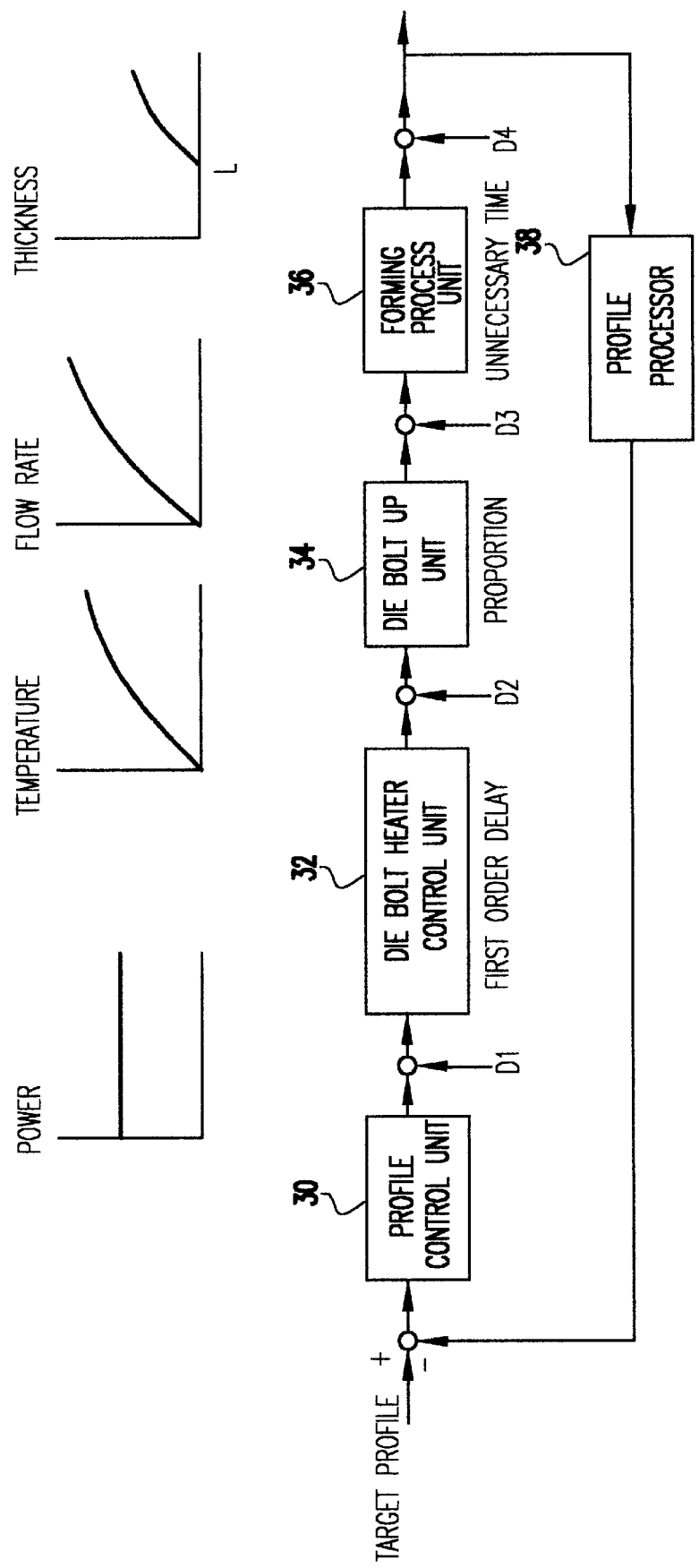
FIG. 4 is a block diagram illustrative of a feed back system for adjusting the heat-displacing T-die.
Figure 5:
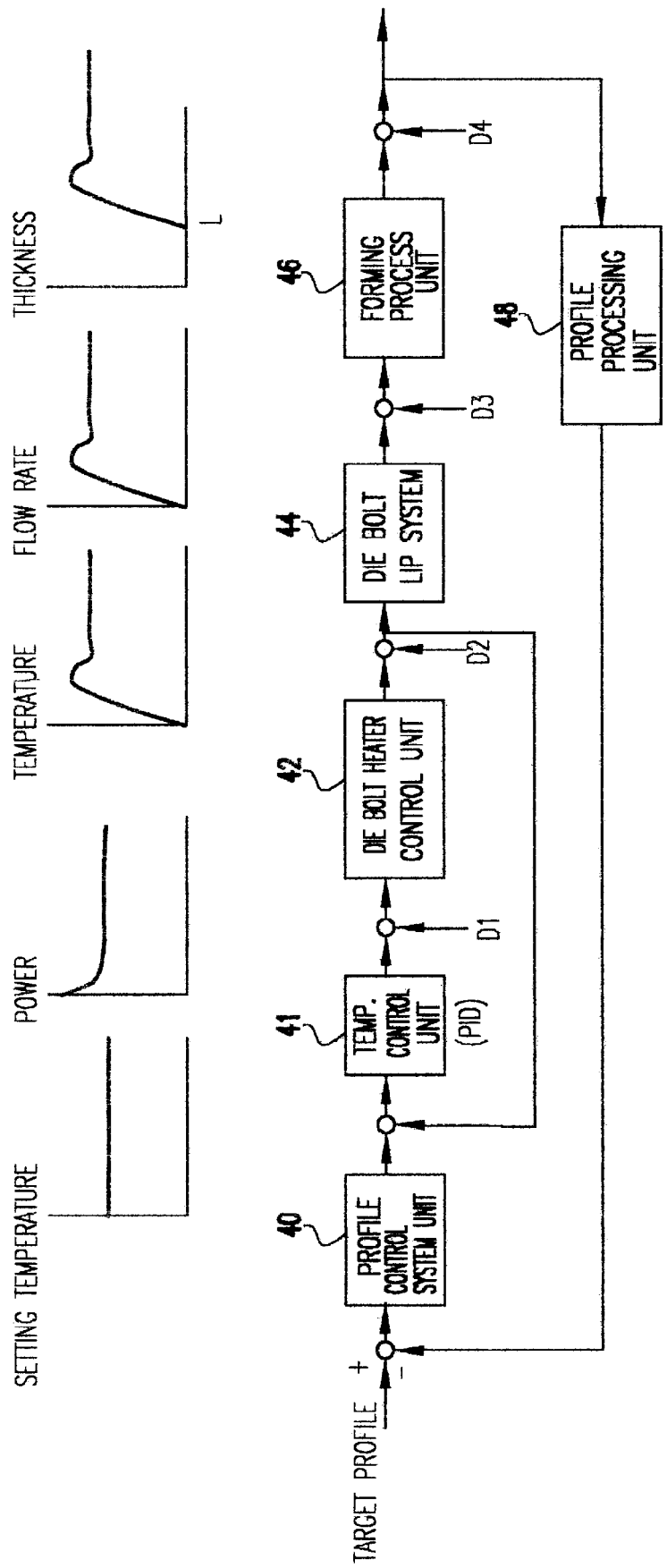
FIG. 5 is a block diagram illustrative of a cascade system for adjusting the heat-displacing T-die.

A target profile is transmitted through a profile control unit 50, a die bolt heater temperature control unit 52, a heater control output unit 53 using, for example, a solid state relay and a die bolt-lip system 54 to a forming process 56 for sheet profile control or adjustment. The heat-displacing T-die as illustrated in FIGS. 1 and 3 is also available in the present invention.

The virtual temperature control loop is provided wherein the temperature of the die bolt is predicted by the die bolt heater temperature control unit 52 from the heater control output value outputted from the heater control output unit 53 and the radiation temperature to the circumference for feeding the same back to the die bolt heater temperature control unit 52.

Similarly to the conventional cascade control, the thickness feed back control loop is provided, wherein the result of the profile control from the forming process 56 is then processed in the thickness profile processor 58 for feeding the same back to the profile control unit 50.

Figure 7A:
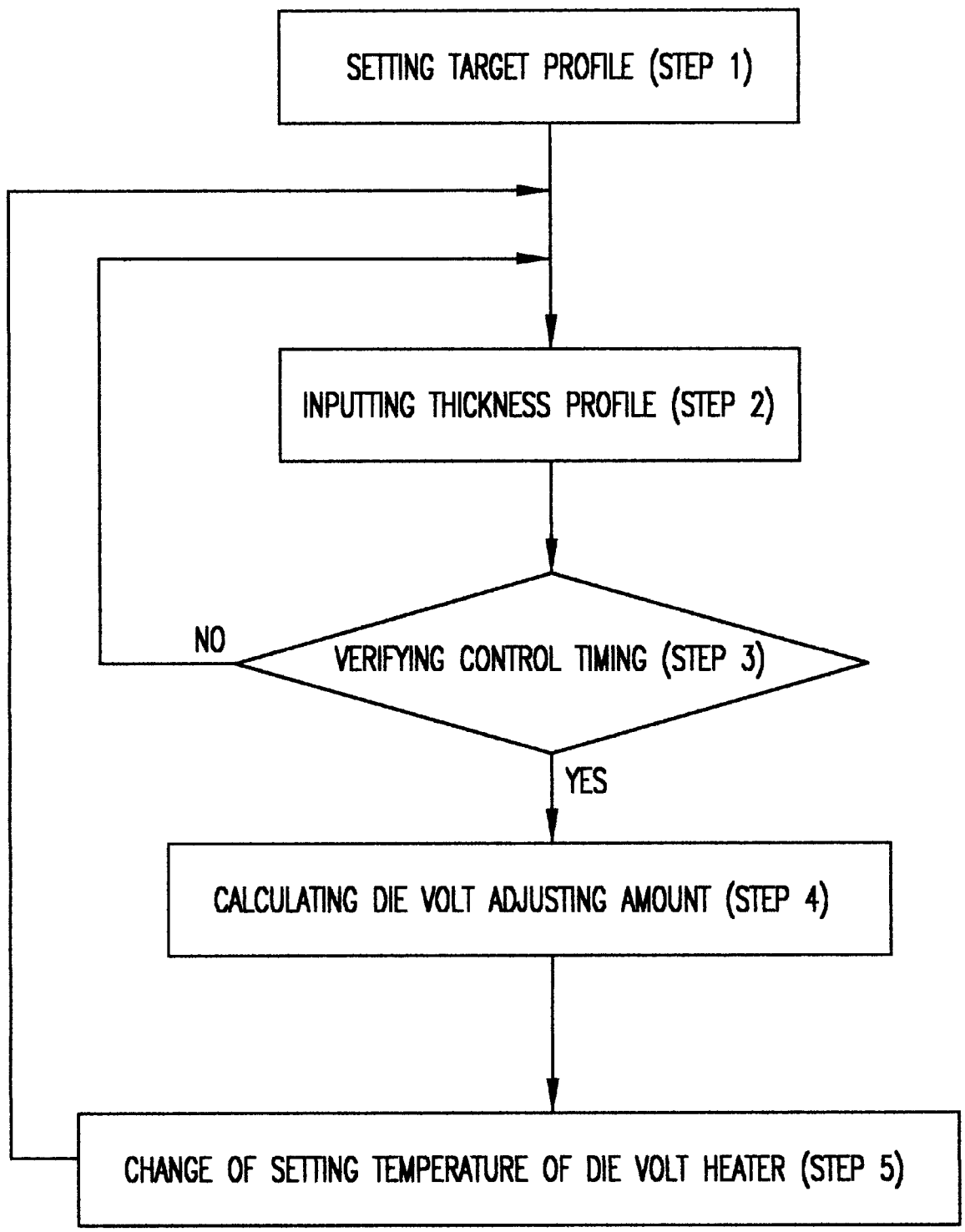
FIG. 7A is a flow chart illustrative of operations of the thickness feed back control in the profile control unit and the thickness profile processing unit.

Operations of the thickness feed back control in the profile control unit 50 and the thickness profile processing unit 58 will be described with reference to FIG. 7A.

In the step 1, a target profile is set for the profile control unit 50. In the step 2, a thickness profile processed in the thickness profile processing unit 58 is fed back for input. In the step 3, the control timing is verified. In the step 4, an amount of the adjustment of the die bolt is calculated from the deviation of the target profile and the thickness profile inputted by the feed back. In the step 5, a renewal temperature is calculated from the calculated amount of the adjustment of the die bolt so that an insurrection signal is outputted for change in setting temperature of the die bolt heater temperature control unit 52. Thereafter the profile control unit 50 waits for control operation until the next control timing comes before the above operations will repeat.

Figure 7B:
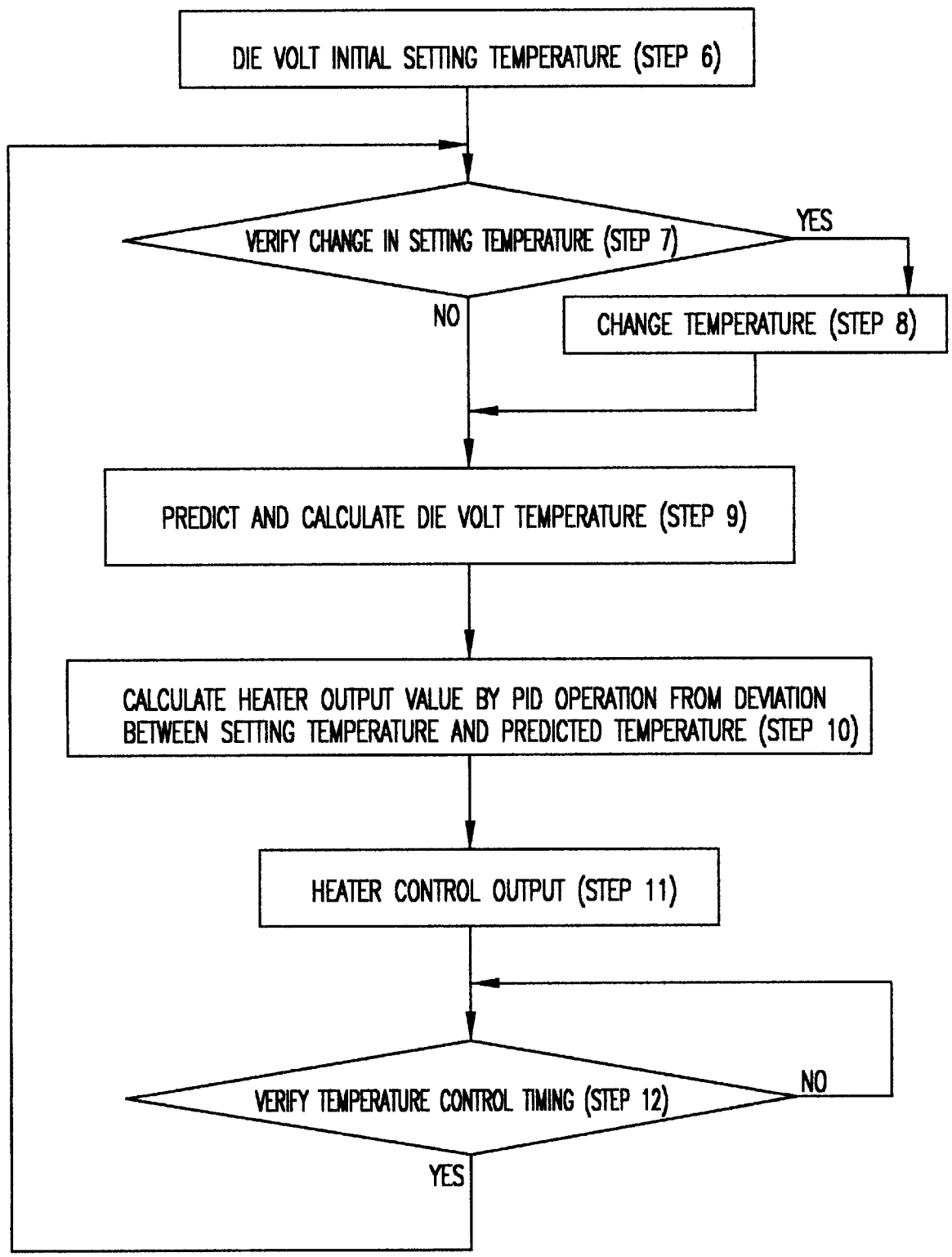
FIG. 7B is a flow chart illustrative of operations of the in the virtual temperature control loop by the die bolt heater control unit, the heater control output device and the die bolt heater temperature prediction and calculation unit.

Subsequently, operations of the in the virtual temperature control loop by the die bolt heater control unit 52, the heater control output device 53 and the die bolt heater temperature prediction and calculation unit 55 will be described with reference to FIG. 7B.

In the step 6, the initial setting temperature of the die bolt is inputted to the die bolt heater temperature control unit 52. In the step 7, an instruction is made by the profile control unit 50 to change the setting temperature at a predetermined timing. In the step 8, the setting temperature is changed whereby the heater control output unit 53 controls the heater for temperature control of the individual die bolts.

If the setting temperature has been changed or no change to the setting temperature has been made, a prediction and calculation of the die bolt temperature is executed in the die bolt heater temperature prediction and calculation unit 55 on the basis of the heater control output value from the heater control output unit 53 in the step 9. A PID operation is made to calculate the heater controlling output value from a difference between the predicted temperature and the setting temperature in the step 10.

The heater control output value calculated thereby is then sent through the die bolt heater temperature control unit 52 and outputted from the heater control output unit 53 for control the temperature of the heater to control the temperature of the individual die bolt in the step 11.

In the step 2, the temperature control timing for operation of the heater control output value is appropriately set for the repeat of the above sequential control operations.

The above prediction and operation of the heater control output value in the die bolt heater temperature prediction and calculation unit 55 will be described in more detail.

The temperature of the die bolt is decided on the basis of a quantity Q0 of a radiation heat to the circumference and a quantity Q1 of the heat generation as the past heater control output value. In this case, since many die bolts are arranged in parallel to each other, then a quantity QB of the heat is also transmitted from the adjacent die bolt.

The quantity Qi of the heat generation of the heater is given by the following equation.

$$Qi = C1 \times (\theta h - \theta i) \qquad (1)$$

where C1 is the conductance of the heat, $\theta h$ is the temperature of the heater and $\theta i$ is the temperature of the die bolt.

On the other hand, the quantity QB of the heat from the adjacent die bolt is given by the following equation.

$$QB = C2i \times (\theta(i-1) - \theta i) + C2i \times (\theta(i+1) - \theta i) \qquad (2)$$

where C2 is the conductance of the heat, $\theta i$ is the temperature of the die bolt, and $\theta(i-1)$, $\theta e(i+1)$ are the temperatures of the adjacent die bolts.

The quantity Q0 of the heat radiation from the heater to the circumference is given by the following equation.

$$Q0 = C3 \times (\theta i - \theta a) \qquad (3)$$

where C3 is the conductance of the heat, $\theta a$ is the ambient temperature around the die bolt heated by the heater, provided $\theta a$ is approximated to be 0 for facilitation of the analysis.

In the light of the steady heat conduction, the quantity Q0 of the heat radiation is given by the following equation.

$$Q0 = Qi + QB \qquad (4)$$

The above equations (1), (2), and (3) are substituted for the above equation (4) and the following equation is given.

$$\theta i = C1/(C1+C3+2C2) \times \theta h + C2/(C1+C3+2C2) \times [\theta(i+1) + \theta(i-1)] \qquad (5)$$

The equation (5) is estimated to be as follows.

$$\theta i = G1 \times \theta h + G2 \times [\theta(i+1) + \theta(i-1)] \qquad (6)$$

where G1 and G2 may be experimentally determined to be numerical.

In the manner as described above, the prediction of the temperature of the die bolt is made so that a new control output value to the heater is calculated under the PID control from the deviation of the setting temperature for sending the same to the heater control output unit 53 for proper temperature control of the die bolt.

The virtual temperature control loop conducts a prediction and calculation on the basis of the control output data of the heat-displacing actuator in a constant period of, for example, 10–30 seconds. The temperature of the individual die bolt can be set and changed by the thickness feed back control loop based upon the signals from the thickness gauge at a control timing of, for example, 2–5 minutes.

Figure 8A:
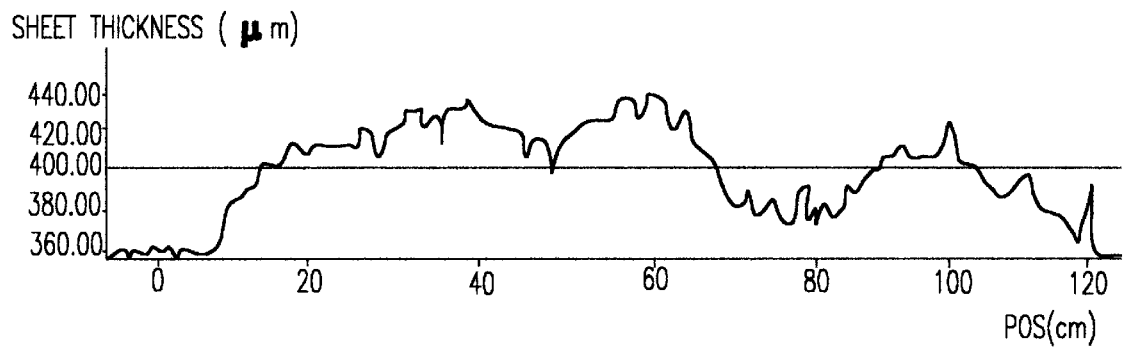
FIG. 8A is a graph illustrative of a variation in thickness of the sheet.
Figure 8B:
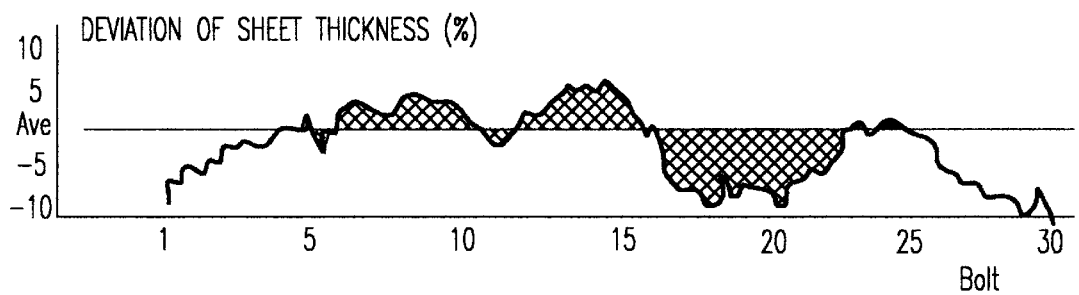
FIG. 8B is also a graph illustrative of deviation of the thickness of the sheet over individual die bolts.
Figure 8C:
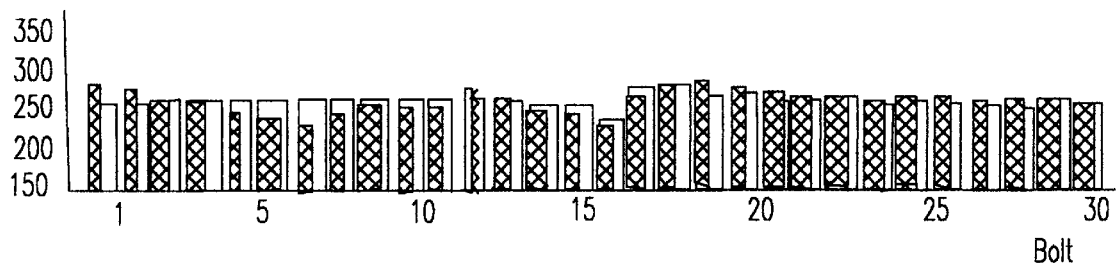
FIG. 8C is a graph illustrative of variations in die bolt heater temperature of individual die bolts, wherein white bars represent the setting temperatures and black bars represent the predicted temperatures.

FIG. 8A is a graph illustrative of a variation in thickness of the sheet. FIG. 8B is also a graph illustrative of deviation of the thickness of the sheet over individual die bolts. FIG. 8C is a graph illustrative of variations in die bolt heater temperature of individual die bolts, wherein white bars represent the setting temperatures and black bars represent the predicted temperatures. The correspondence between the white and black bars means an ideal state free of any external disturbance.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method of adjusting a heat-displacing T-die, wherein a T-die slit gap is adjusted by thermal expansion and contraction of die bolts individually provided with heaters so that a sheet or film material has a target profile in thickness, the method comprising the steps of:

providing a thickness feed back control loop, wherein the thickness feed back control loop calculates a target profile adjustment for the die bolts so as to define a spacing of the T-die slit gap based on a deviation between the target profile in thickness and a measured thickness profile of the sheet or film material;

providing a virtual temperature control loop, wherein the virtual temperature control loop predicts a temperature of the die bolts based on a control output value of the heaters and a radiation temperature to the circumference of the die bolts so as to calculate a power to be supplied to the heaters; and controlling the die bolt temperature by supplying the power to the heaters thereby adjusting the T-die slit gap based on the steps of calculating a target profile adjustment and predicting the die bolt temperature.

2. The method of claim 1, wherein providing the thickness feed back control loop further comprises:

setting the target profile in thickness prior to forming the product;

processing the thickness profile of the product after the setting the target profile; and providing the thickness profile to an input of the thickness feed back control loop in the step of providing the thickness feed back control loop.

3. The method of claim 1, wherein the target profile adjustment for the die bolts is calculated from the deviation between the target profile and the thickness profile inputted by a feed back to the thickness feed back control loop.

4. The method of claim 1, further comprising calculating a renewal temperature from a calculated amount of the target profile adjustment for the die bolts so that an insurrection signal is outputted for change in a setting temperature of a die bolt heater temperature control unit.

5. The method of claim 1, wherein providing the virtual temperature control loop includes:

receiving a setting temperature for the die bolts;

controlling the temperature of the die bolts based on the setting temperature, the temperature being controlled by adjusting the power of the heaters; and predicting and calculating a predicted temperature of the die bolts based on the temperature output from the controlling step, and wherein the temperature is calculated from a difference between the predicted temperature and the setting temperature.

6. The method of claim 5, wherein providing the virtual temperature control loop further includes periodically repeating the steps of claim 5.

* * * * *